United States Patent [19]
Nakayama et al.

[11] 3,713,977
[45] Jan. 30, 1973

[54] PROCESS FOR PRODUCING L-HISTIDINE

[75] Inventors: Kiyoshi Nakayama, Sagamihara; Kazumi Araki, Tokyo, both of Japan

[73] Assignee: Kyowa Hakko Kogyo Co., Ltd.

[22] Filed: Jan. 7, 1971

[21] Appl. No.: 104,772

[30] Foreign Application Priority Data

Jan. 22, 1970 Japan..................................45/5389

[52] U.S. Cl.....................195/29, 195/28 R, 195/30, 195/47
[51] Int. Cl................................................C12d 13/06
[58] Field of Search......................195/28, 29, 30, 47

[56] References Cited

UNITED STATES PATENTS 3,562,110  2/1971  Douros et al. .....................195/28 R

OTHER PUBLICATIONS

Chapman et al., J. Bact March 1969, p. 1444–1448 1969.
Peterson et al., C.A. No. 9162b, 1952.

*Primary Examiner*—A. Louis Monacell
*Assistant Examiner*—Gary M. Nath
*Attorney*—Ward, McElhannon, Brooks & Fitzpatrick

[57] ABSTRACT

L-histidine is produced by fermentation of an aqueous nutrient media with organisms of the genera Brevibacterium, Corynebacterium, Arthrobacter, Microbacterium, Micrococcus, Bacillus, Nocardia, and Azotobacter which organisms are resistant to analogues of L-histidine.

7 Claims, No Drawings

PROCESS FOR PRODUCING L-HISTIDINE

BACKGROUND OF THE INVENTION

The present invention relates to a process for producing L-histidine by fermentation, characterized by culturing in a nutrient medium an L-histidine-producing microorganism selected from the genera, Brevibacterium, Corynebacterium, Arthrobacter, Microbacterium, Micrococcus, Bacillus, Nocardia and Azotobacter, accumulating L-histidine in the culture liquor and recovering L-histidine therefrom.

L-histidine is a basic amino acid which is essential in the nutrition of animals, especially rats. Therefore, the establishment of a relatively inexpensive, industrial process for the production thereof has been intensively sought.

Heretofore, only limited methods have been available for the production of L-histidine. For example, there is a process for the production of L-histidine by optically resolving DL-histidine prepared by a synthetic method. It is also known to produce L-histidine by hydrolyzing proteins. However, these processes are not commercially feasible, and no industrial process for the production of L-histidine has heretofore been found.

SUMMARY OF THE INVENTION

The present invention provides an efficient process for producing L-histidine in high yield by fermentation. It has now been found that certain strains of microorganisms belonging to the genera Brevibacterium, Corynebacterium, Arthrobacter, Microbacterium, Micrococcus, Nocardia, Bacillus, and Azotobacter are capable of producing a considerable amount of L-histidine. The L-histidine is accumulated in the culture medium and may be easily removed therefrom. Thus, the present invention provides an economical commercial process for the production of L-histidine.

The organisms found useful in the present invention belong to the genera Brevibacterium, Corynebacterium, Arthrobacter, Microbacterium, Micrococcus, Nocardia, Bacillus and Asotobacter; all of which are found within the class Schizomycetes. Brevibacterium is a genus within the family Brevibacteriaceae, order Eubacteriales and is generally characterized by: short, unbranching rods; generally non-motile; type of motility of motile species is peritrichous or uncertain; sometimes chromogenic, with non-water-soluble reddish, reddish orange, yellow or brown pigments; may or may not reduce nitrates; glucose broth usually becomes acid; lactose not fermented; proteolytic action varies with the species; aerobic and facultatively anaerobic; rarely microaerophilic. Corynebacterium is a genus within the family Corynebacteriaceae, order Eubacteriales, and is generally characterized by: straight to slightly curved rods with irregularly stained segments, sometimes granules; frequently show club-shaped swellings, snapping division produces angular and palisade (picket-fence) arrangements of cells; non-motile with exceptions among the plant pathogens; gram-positive, but sometimes young cells and sometimes old cells losing the stain easily; granules invariably gram-positive; generally quite aerobic, but microaerophilic or even anaerobic species occur; catalase-positive; may or may not liquefy gelatin; may or may not produce nitrites from nitrates; may or may not ferment sugars, but seldom, if ever, is a high acidity produced; many species oxidize glucose completely to $CO_2$ and $H_2O$ without producing visible gas. Arthrobacter is a genus within the family Corynebacteriaceae, order Eubacteriales, and is generally characterized by: in young cultures the cells appear as rods which may vary in size and shape from straight or bent, curved, swollen or club-shaped forms; snapping division may show angular cell arrangement; short filament formation with rudimentary budding may occur, especially in richer liquid media; gram-negative or gram-variable, coccoid cells are characteristically observed in cultures after one or more days, these coccoid cells persist as the predominate form in older cultures and are gram-negative to gram-positive; larger coccoid cells which give rise to one or more rod-shaped cells on fresh transfer also occur; generally non-motile; growth on solid media soft or viscous; growth on liquid media generally non profuse; most species liquefy gelatin; little or no acid from carbohydrates; nitrites generally produced from nitrates; indole not produced; aerobic; most species show little or no growth at 37°C.. Microbacterium is a genus within the family Corynebacteriaceae, order Eubacteriales and is characterized by: small rods with rounded ends; vary in length from 0.5 to 30 microns; non-motile, granulations demonstratable with methylene blue stain; gram-positive; good surface growth on media supplemented with milk or yeast extract, acid production weak with principally L (+) — lactic acid produced from fermented carbohydrates; catalase-positive; optimum temperature, 32°C.. Micrococcus is a genus within the family Micrococcaceae, order Eubacteriales and is characterized by: cells in irregular masses; the group is regarded as gram-positive although some species lose their power to retain the stain so quickly that they are frequently reported as gram-negative; some species are motile or show motile varieties; growth on agar usually abundant; some species form no pigment but others form yellow, orange or red pigments; catalase-positive so far as known; glucose broth slightly acid, lactose broth generally neutral; gelatin frequently liquified, but never rapidly; saprophytic, facultatively parasitic or parasitic. Nocardia is a genus within the family Actinomycetaceae, order Actinomycetales and is generally characterized by: slender filaments or rods, frequently swollen and occasionally branched, forming a mycelium which, after reaching a certain size, assumes the appearance of bacterium-like growths; shorter rods and coccoid forms in older cultures; conidia not formed; stain readily, occasionally showing a slight degree of acid-fastness; non-motile, no endospores; aerobic; gram-positive. Bacillus is a genus within the family Bacillaceae, order Eubacteriales and is generally characterized by: rod-shaped cells, sometimes in chains, capable of producing endospores; motile by means of peritrichous flagella, or non-motile; gram-positive, some species being gram-variable or gram-negative; catalase-positive; aerobic or facultatively anaerobic. Azotobacter is a genus within the family Azotobacteraceae, order Eubacteriales and is generally characterized by: relatively large rods or even cocci; cells without endospores; peritrichous flagellation; gram-negative; obligate aerobes, usually growing in a film on the surface of the culture medium; capable of fixing atmospheric nitrogen when provided with carbohydrate or other energy source; grow best on media deficient in nitrogen.

The present invention comprehends the finding that mutant strains of the noted genera which exhibit resistance to analogues of L-histidine (for example; α methylhistidine, 1,2,4-triazole-3-alanine, 2-thiazolealanine, 3-amino-1,2,4-triazole, hydrazinoimidazolepropionic acid, etc.) are also excellent producers of L-histidine. The expression "mutant resistant to analogues of histidine" throughout the present specification means the mutant of which growth is not inhibited by analogues of histidine while that of most strains is inhibited. Such resistance is determined usually by checking if the mutant can grow in a medium containing 500 γ/ml. of an analogue though the concentration varies depending upon the microorganisms and the analogues. Accordingly, standard tests may be employed to determine the L-histidine producing capabilities of strains of the aforementioned genera. However, resistance to analogues of L-histidine is not an essential characteristic of all strains which produce L-histidine since there are some strains which are capable of producing a considerable amount of L-histidine but which do not exhibit such resistance. Accordingly, it will be understood that the present invention comprehends all species, or strains of species, of organisms within the genera Brevibacterium, Corynebacterium, Arthrobacter, Microbacterium, Micrococcus, Bacillus, Nocardia, and Azotobacter, which are capable of producing L-histidine. The following strains of the aforementioned genera have been found to be good L-histidine producing microorganisms:

Brevibacterium divaricatum
Brevibacterium ammoniagenes
Brevibacterium ketoglutaricum
Corynebacterium lilium
Microbacterium ammoniaphilum
Bacillus subtilis
Arthrobacter paraffineus
Corynebacterium hydrocarboclastus Particularly preferred strains are *Brevibacterium flavum* (ATCC 21605), *Corynebacterium glutamicum* (ATCC 21607, 21604), *Arthrobacter citreus* (ATCC 21600), *Bacillus megaterium* (ATCC 21603) and *Nocardia globerula* (ATCC 21602). These strains have been deposited with the American Type Culture Collection, Rockville, Maryland and have been accorded the noted accession numbers.

In addition to the above, the following group of L-glutamic acid producing microorganisms have also been found to have excellent L-histidine producing capabilities:

Brevibacterium glutamigenum
Brevibacterium lactofermentum
Brevibacterium saccharolyticum
Brevibacterium thiogenitalis
Corynebacterium callunae
Corynebacterium acetoacidophilum
Corynebacterium mellassecola
Microbacterium flavum var. glutamicum Production of L-histidine in accordance with the present invention is preferably carried out by fermentation, under aerobic conditions, of an aqueous nutrient media such as by shaking culture or submerged culture.

It is also preferred to maintain the culturing temperature between 20° and 40°C. and the pH approximately neutral to obtain a high yield. However, the temperature and pH conditions may vary according to the specific microorganisms used.

The culture medium employed in the present invention may be either synthetic or natural, so long as the medium properly contains a carbon source, a nitrogen source, inorganic compounds and small amounts of additional nutrients necessary for the specific microorganism used. Other than the above, there are no special restrictions attached to other essentials of the medium composition. The carbon source may comprise various carbohydrates for example, glucose, glycerol, fructose, sucrose, maltose, mannose, starch, starch hydrolyzate liquor, molasses, etc.. Polyalcohol and various acids such as pyruvic acid, fumaric acid, lactic acid, acetic acid, etc. may also be used. Furthermore, hydrocarbons and alcohols may be used according to the assimilability of the microorganism used. As the nitrogen source, various substances can be used, for example, ammonia; various kinds of inorganic or organic ammonium salts such as ammonium chloride, ammonium sulfate, ammonium carbonate or ammonium acetate; urea and other nitrogen-containing substances; and nitrogeneous organic substances such as peptone, NZ-amine (enzymatic digest of casein), meat extract, yeast extract, corn steep liquor, casein hydrolyzate, fish meal and fish meal digest, defatted soybean cake and its digest, and chrysalis hydrolyzate. As inorganic compounds, dipotassium hydrogen phosphate, potassium dihydrogen phosphate, magnesium sulfate, sodium chloride, ferrous sulfate, manganese sulfate, and calcium carbonate may be used. In cases of strains requiring very small amounts of nutrients such as vitamins, amino acids, bases etc. for growth, these nutrients may be added to the medium.

It is preferred that the microorganism be grown in a seed medium prior to being used for inoculation of the culture medium. The seed medium is incubated under favorable growth conditions for a period of time sufficient to develop a suitable organism population, typically for about 24 hours. The seed medium is then used to inoculate the culture medium. Fermentation is then carried out until a considerable amount of L-histidine is produced and accumulated in the resultant medium, usually 1 to 5 days. After the completion of culturing, the L-histidine is readily recovered from the medium by separating the medium from the cells and subjecting the cell free medium to an ion exchange treatment or the like.

Practice of certain specific embodiments of the invention is illustrated by the following representative examples.

EXAMPLE 1

In this example, the fermentation is carried out using an L-histidine-producing mutant (ATCC 21607), which is resistant to 2-thiazolealanine. The mutant strain is obtained from *Corynebacterium glutamicum* (ATCC 13032) (also identified as *Micrococcus glutamicus*). The strain is cultured for 24 hours, with shaking, in a seed medium containing 2 percent glucose, 1 percent peptone, 1 percent yeast extract and 0.3 percent NaCl at 30°C.. One ml. of this seed culture broth is inoculated into a 250 ml. Erlenmeyer flask containing 10 ml. of a fermentation medium containing 10 percent glucose, 0.05 percent $K_2HPD_4$, 0.05 percent $KH_2PO_4$, 2 percent $(NH_4)_2SO_4$, 0.025 percent $MgSO_4 \cdot 7H_2O$, 0.001 percent $FeSO_4 \cdot 7H_2O$, 0.001 percent $MnSO_4 \cdot 4H_2O$, 0.5 percent NZ-amine, 50 µg./l. of biotin, 2 mg./l. of thiamine hydrochloride and 2 percent $CaCO_3$ (pH 7.2). Cultivation is carried out at 30°C. for 72 hours with shaking. A concentration of 4.3 mg./ml. of L-histidine is accumulated in the culture liquor. After the removal of microorganism cells and $CaCO_3$ from the culture liquor, the L-histidine in the liquor is recovered by ion exchange treatment. Yield from one 1. of the cultured liquor was 3.0 g..

EXAMPLE 2

This example is carried out in the same manner as Example 1 except that the various species shown in Table 1 are used as seed microorganisms.

TABLE 1

| Microorganism used | L-histidine (mg./ml.) |
| --- | --- |
| Brevibacterium divaricatum | 3.2 |
| Brevibacterium flavum (ATCC 21605) | 4.3 |
| Brevibacterium ammoniagenes | 4.2 |
| Corynebacterium lilium | 1.8 |
| Arthrobacter citreus (ATCC 21600) | 1.2 |
| Microbacterium ammoniaphilum | 3.2 |
| Bacillus subtilis | 2.2 |
| Bacillus megaterium (ATCC 21603) | 1.8 |

EXAMPLE 3

In this example, L-histidine-producing strains of Nocardia globerula, Brevibacterium ketoglutaricum, Arthrobacter paraffineus and Corynebacterium hydrocarboclastus are used as the seed microorganisms. Each of these strains is inoculated into respective seed culture mediums containing 2 percent sorbitol, 1 percent meat extract, 1 percent peptone, 0.5 percent yeast extract and 0.3 percent NaCl and cultured at 30°C. for 24 hours. One ml. of the seed culture broth is then inoculated into a 250 ml. Erlenmeyer flask containing 10 ml. of a fermentation medium comprising 10 percent n-paraffin ($C_{11}$ – $C_{13}$), 2 percent $(NH_4)_2SO_4$, 0.2 percent $KH_2PO_4$, 0.2 percent $K_2HPO_4$, 0.1 percent $MgSO_4 \cdot 7H_2O$, 0.001 percent $FeSO_4 \cdot 7H_2O$, 0.001 percent $MnSO_4 \cdot 4H_2O$, 0.001 percent $ZnSO_4 \cdot 7H_2O$, 5 mg./l. of thiamine hydrochloride, 0.3 percent yeast extract and 2 percent $CaCO_3$ (pH 7.2). Cultivation is carried out at 30°C. for 5 days with shaking. The amounts of L-histidine produced in the culture liquors are given in Table 2, respectively.

TABLE 2

| Microorganism used | L-histidine (mg./ml.) |
| --- | --- |
| Nocardia globerula (ATCC 21602) | 1.6 |
| Brevibacterium ketoglutaricum | 1.2 |
| Arthrobacter paraffineus | 1.8 |
| Corynebacterium hydrocarboclastus | 2.1 |

EXAMPLE 4

In this example, the organism employed is a L-histidine-producing mutant (ATCC 21604), which is resistant to 1,2,4-triazolealanine. The mutant is derived from Corynebacterium glutamicum. The strain is cultured at 30°C. for 24 hours with shaking in a seed medium containing 4 percent glucose, 2 percent peptone, 0.15 percent $KH_2PO_4$, 0.05 percent $K_2HPO_4$, 0.05 percent $MgSO_4 \cdot 7H_2O$, 50 µg./l. of biotin and 0.5 percent yeast extract. One ml. of the seed culture is inoculated into a 250 ml. Erlenmeyer flask containing 10 ml. of fermentation medium. The fermentation medium is composed of 10 percent sweet potato waste molasses (in terms of glucose), 2 percent soybean cake hydrolyzate liquor (soybean cake digested in 6 N $H_2SO_4$ and neutralized with ammonium hydroxide; in terms of soybean cake amount), 0.3 percent urea, 0.05 percent $MgSO_4 \cdot 7H_2O$, 0.07 percent $KH_2PO_4$ and 3 percent $CaCO_3$ (pH 7.2). Cultivation is carried out at 30°C. for 72 hours with shaking, and L-histidine is recovered in the same manner as in Example 1. The amount of L-histidine produced in the cultured liquor is 13.8 mg./ml..

What is claimed is:

1. A process for producing L-histidine by fermentation which comprises aerobically culturing in a nutrient medium an L-histidine producing microorganism which is resistant to analogues of L-histidine and belongs to the genus Brevibacterium, Corynebacterium, Arthrobacter, Microbacterium, Micrococcus, Bacillus, Nocardia or Azotobacter; accumulating L-histidine in said medium, and recovering said L-histidine.

2. A process according to claim 1 wherein said microorganism is Corynebacterium glutamicum (ATCC 21607).

3. A process according to claim 1 wherein said microorganism is Corynebacterium glutamicum (ATCC 21604).

4. A process according to claim 1 wherein said microorganism is Brevibacterium flavum (ATCC 21605).

5. A process according to claim 1 wherein said microorganism is Arthrobacter citreus (ATCC 21600).

6. A process according to claim 1 wherein said microorganism is Bacillus megaterium (ATCC 21603).

7. A process according to claim 1 wherein said microorganism is Nocardia globerula (ATCC 21602).

* * * * *